United States Patent
Feichtinger et al.

(10) Patent No.: US 8,901,224 B2
(45) Date of Patent: Dec. 2, 2014

(54) PROCESS FOR PRODUCING A FILLED POLYMER MATERIAL

(75) Inventors: Klaus Feichtinger, Linz (AT); Gerhard Wendelin, Linz (AT); Manfred Hackl, Linz (AT)

(73) Assignee: EREMA Engineering Recycling Maschinen und Anlagen Gesellschaft m.b.H, Ansfelden (AT)

( * ) Notice: Subject to any disclaimer, the term of this patent is extended or adjusted under 35 U.S.C. 154(b) by 304 days.

(21) Appl. No.: 12/922,677

(22) PCT Filed: Mar. 30, 2009

(86) PCT No.: PCT/AT2009/000127
§ 371 (c)(1),
(2), (4) Date: Nov. 2, 2010

(87) PCT Pub. No.: WO2009/121085
PCT Pub. Date: Oct. 8, 2009

(65) Prior Publication Data
US 2011/0040011 A1 Feb. 17, 2011

(30) Foreign Application Priority Data
Mar. 31, 2008 (AT) .................. A 502/2008

(51) Int. Cl.
*C08K 3/26* (2006.01)
*B29B 17/04* (2006.01)
*C08J 3/20* (2006.01)
*C08K 3/00* (2006.01)
*B29K 67/00* (2006.01)

(52) U.S. Cl.
CPC ............ *B29B 17/0412* (2013.01); *C08J 3/203* (2013.01); *C08K 3/0033* (2013.01); *C08K 3/26* (2013.01); *B29B 2017/048* (2013.01); *B29K 2067/003* (2013.01); *C08J 2367/02* (2013.01)
USPC ........................................ 524/425

(58) Field of Classification Search
CPC ............... B29B 17/0412; B29B 2017/048; C08K 3/0033; C08J 2367/02
USPC .......................................... 524/425
See application file for complete search history.

(56) References Cited

U.S. PATENT DOCUMENTS

| | | | |
|---|---|---|---|
| 3,862,084 A * | 1/1975 | Zandstra et al. | 524/401 |
| 6,479,029 B1 * | 11/2002 | Mingels et al. | 423/432 |
| 6,734,234 B1 | 5/2004 | Deardurff | |
| 6,784,214 B1 * | 8/2004 | Bacher et al. | 521/48 |
| 2008/0037571 A1 * | 2/2008 | Hetzel et al. | 370/408 |

FOREIGN PATENT DOCUMENTS

| | | |
|---|---|---|
| EP | 1 273 412 A1 | 1/2003 |
| EP | 1 612 234 A1 | 1/2006 |
| FR | 2 626 580 A1 | 8/1989 |

OTHER PUBLICATIONS

Handbook of Fillers, Wypych, G. 2nd edition, 2000, chapter 2.*

* cited by examiner

*Primary Examiner* — Doris Lee
(74) *Attorney, Agent, or Firm* — Kilpatrick Townsend & Stockton LLP

(57) ABSTRACT

The invention relates to a method for producing a thermoplastic polymer material that is filled with at least one filler, preferably calcium carbonate $CaCO_3$, sensitive to hydrolytic degradation and optionally hygroscopic, and produced by way of polycondensation, particularly PET, wherein under vacuum conditions, constant stirring or mixing and an increased temperature, a mixture of not yet melted, optionally softened, polymer material comprising the filler is produced, wherein for this purpose a filler, which at the time of addition has not been pre-dried and has a residual moisture ($H_2O$) of more than 500 ppm, particularly more than 1000 ppm, is used.

15 Claims, No Drawings

US 8,901,224 B2

PROCESS FOR PRODUCING A FILLED POLYMER MATERIAL

CROSS-REFERENCES TO RELATED APPLICATIONS

This application is a National Stage of International Application No. PCT/AT2009/000127 filed Mar. 30, 2009, and which claims the benefit of Austrian Patent Application No. A 502/2008, filed Mar. 31, 2008, the disclosures of which are incorporated herein by reference.

AREA OF THE INVENTION

The present invention relates to a process for producing a thermoplastic polymer material, in particular PET, that is filled with at least one filler, preferably calcium carbonate $CaCO_3$, sensitive to hydrolytic degradation, optionally hygroscopic and produced by polycondensation, in which a mixture of not yet molten, optionally softened polymer material is produced with the filler under vacuum conditions, constant agitation and thorough mixing and elevated temperature, whereby to this end a filler that had not been pre-dried at the time of addition and with a residual moisture ($H_2O$) of more than 500 ppm, in particular more than 1000 ppm, is used, and to a use in accordance with claim 13.

BACKGROUND OF THE INVENTION

Numerous plastics and polymers are known from the state of the art that are filled with a filler, for example, an inert mineral powder. A compounding with filler usually takes place in order to lower the average costs of the product or to impart certain properties to the product.

Numerous processes are also known with which fillers can be mixed into a polymer. Thus, the fillers can be added, for example, into a plastic melt. Furthermore, there is the possibility of a "cold mixing", in which the plastic and the fillers are mixed with each other at low temperatures and the mixture is subsequently heated and melted.

In addition, there is the possibility of adding the fillers to a pre-warmed, softened polymer material and not melting the mixture until in a further step. Such a method is known, for example from EP 1 401 623. In it, the fillers are mixed into polyolefins such as, e.g., polyethylene or polypropylene in that at first the polymer material is brought into a softened state and subsequently the fillers, in the present instance calcium carbonate, are added. The mixture is subsequently melted and/or compressed.

It is also known from the state of the art that thermoplastic materials produced by polycondensation, so-called polycondensates, in particular polyesters, especially PET, can be compounded with fillers, for example, with calcium carbonate. Such filled polyesters are used, for example, as bottles.

However, in the case of polycondensates, in particular polyesters, the particular properties of this type of plastic are generally to be considered that make a recycling and/or reusing of these plastics tricky and problematic.

It should be noted in this regard by way of explanation that, for example, PET can be present in two different structures, namely, in amorphous or in crystalline or partially crystalline form. Amorphous PET is usually transparent, and crystalline PET is opaque or white. As is the case for all thermoplastics that can occur in amorphous or crystalline form, a crystallinity degree of 100% can also not be achieved with PET. Only a part of the structure of PET is capable of orienting itself, that is, to crystallize. Crystalline and amorphous areas alternate with each other, therefore, it is correct to speak of a partial crystallinity. It is possible with PET to achieve a crystallinity degree of approximately 50%. This means that in this state one half of the molecular chains have oriented themselves to each other, that is, they place themselves parallel adjacent to each other or have wound themselves in a circular manner. Therefore, the interactions, in particular van der Waals forces, between the molecular chains obligatorily become greater in the partially crystalline areas. The chains are therefore drawn reciprocally to each and therefore the intermediate spaces between the molecular chains become smaller.

However, the molecular structure of PET can be destroyed by certain factors.

A first degradation mechanism is brought about by thermal degradation of the molecular chains. Here, the bonds between the individual molecules are destroyed by too great a heating. For this reason an appropriate dwell time and a suitable working temperature is to be observed in order to achieve a qualitatively high-grade product.

A second relevant degradation mechanism is the hydrolytic degradation, i.e., PET is, like other polycondensates, susceptible to water and/or moisture:

The water and/or the moisture come(s) substantially from two sources: on the one hand, PET has a hydroscopic structure, i.e., PET absorbs the moisture. This moisture is embedded in the intermolecular intermediate spaces and remains as so-called inner moisture in the polymer itself or in its interior. The inner moisture of the original polymer is a function of the particular environmental conditions. PET has a certain inner equilibrium moisture in the moderate latitudes of approximately 3000 ppm.

Moreover, additional moisture is present on the outer surface of the polymer or of the polymer flakes (outer moisture) that must also be considered during the working.

If too much moisture is present during the working or during the recycling or the extrusion of PET, regardless of from which source, the polymer chains of the PET are hydrolytically split and the initial products, namely, terephthalic acid and ethylene glycol, are partially re-formed in a chemical reaction. This hydrolytic degradation of the chain length of the molecules results in a strong degradation of viscosity as well as a deterioration of the mechanical properties of the end product and disadvantageous changes to the properties of the plastic. The damage can even be so great that the material can no longer be used for the processing of bottles, sheets, etc.

Polyester is especially sensitive, in particular at an elevated temperature, to moisture, in particular, polymer melts react extremely rapidly at approximately 280° C. with water and PET is degraded within seconds. In order to prepare PET again during recycling, however, energy in the form of heat must necessarily be supplied to the material, in particular during the concluding extrusion.

Therefore, in order to protect the polycondensate from hydrolytic degradation and to maintain the polymer chains, all moisture must be removed to the extent possible from the material prior to the pre-preparation or prior to too great an elevation of the temperature and a suitable adjustment of the temperature and of the dwell time must be observed during the working.

Thus, for example, if moist PET is to be worked or prepared and if this PET is introduced into a cutting compressor, then the attempt must be made by suitable measures to prevent hydrolytic damage to the polyester. In order to obtain a qualitatively appropriate end product, it is therefore necessary when recycling or working sensitive polycondensates such as polyesters to reduce to the extent possible the inner moisture as well as the outer moisture adhering to the surface of the plastic. The hydrolytic degradation is not maintained within limits until by an appropriate drying, especially below 100 ppm.

Various engineering possibilities are available for this. Thus, for example, the attempt can be made to remove the outer moisture adhering to the plastic by placing a vacuum or by elevating the temperature.

However, even other engineering problems must be considered here. Thus, for example, amorphous and also partially crystalline PET tend to adhere when heated, which is also a great problem in practice. This problem can only be solved by constant agitation.

Furthermore, it should be borne in mind that some types of plastic are susceptible to oxidative degradation processes, as a result of which the chain length of the plastic molecules is also reduced, which also can entail disadvantageous changes to the properties of the plastics such as, e.g., to the color, strength, etc. Again, in order to prevent this oxidative degradation, there is the possibility of carrying out the working of such sensitive plastics under the avoidance of air, e.g., under an atmosphere of inert gas.

The efficient and economical preparation of polycondensates or polyesters is therefore extremely problematic, among other things, on account of the numerous degradation processes to be taken into consideration and requires a special carrying out of the processes. All this makes the recycling of polycondensates, especially of polyesters and quite in particular of PET, especially problematic and tricky so that an economical recycling of such plastics did not become possible until the development of special ways of carrying out the processes.

Of course, this also applies to the production of polycondensates and polyesters filled with fillers. However, it must additionally be taken into account in the case of filled polycondensates that large amounts of additional moisture are introduced not only via the polymer but also by the fillers themselves, which moisture has a negative effect on the chain length. Thus, for example, calcium carbonate has a very large specific surface and binds large amounts of moisture, namely, above 1000 ppm at 20° and 60% atmospheric moisture.

It was possible in the past to remove outer and inner moisture somewhat effectively from the polymer material with the familiar processes known from the state of the art; however, even additional further moisture is introduced via the filler in a large amount, which results in problems and the process rapidly becomes uneconomical and the quality of the obtained products, i.e., the filled polymers, drops.

This problem is solved in practice in that the fillers are pre-dried in a separate process before being added. The drying of a powdery filler is, however, quite difficult, complicated and expensive. Due to the above-cited problems concerning the hydrolytic degradation of the polymer, it was, however, an absolute necessity in practice to carry out such a pre-drying since otherwise the polycondensate would be too greatly degraded and the quality of the end product would drop. Moreover, this requires an additional process step first, namely, the pre-drying of the fillers, that lengthens the entire process.

Alternatively, there is the possibility of using coated fillers, that is, fillers that are coated on the surface and whose surface is correspondingly reduced as a result. Such coated fillers bind less water and therefore bring less moisture into the plastic material. However, such coated fillers are also considerably expensive and are complex to produce.

SUMMARY OF THE INVENTION

The present invention therefore has the problem of creating a method for the production of a filled, hygroscopic polycondensate, in particular PET that is sensitive to hydrolytic degradation, which method supplies qualitatively high-grade end products and at the same time can be carried out rapidly and in an economically efficient manner.

This problem is solved in that a process for the production of an optionally hygroscopic, thermoplastic polymer material, in particular PET, that is filled with at least one filler, preferably calcium carbonate $CaCO_3$, sensitive to hydrolytic degradation and produced by polycondensation is provided in which a mixture of not yet molten, optionally softened polymer material is produced with the filler under vacuum conditions, constant agitation and/or thorough mixing and elevated temperature, whereby to this end a filler that is not pre-dried at the time of addition and with a residual moisture ($H_2O$) of more than 500 ppm, in particular more than 1000 ppm, is used.

It was surprisingly shown by tests that polycondensates, in particular PET, that are hygroscopic and sensitive to hydrolytic degradation can be compounded and/or filled with the process in accordance with the invention without negative effects on the chain length, even with non-pre-dried raw fillers, even with a residual moisture of more than 500 ppm.

As was determined above, more particularities must be taken into account during the tricky preparation and treatment of polycondensates, in particular in the case of PET, in comparison to polyolefins or other plastics, which particularities make the processing of polycondensates a quite special process. The carrying out of the process in accordance with the invention is to be shaped in such a manner with an appropriate dwell time that the process is carried out under a vacuum, elevated temperature and constant agitation.

The exact parameters are a function of the polymer material: however, the temperature fluctuates approximately between 110° to 240°, the circumferential speed of the mixing tool is in a range of approximately 2 to 35 m/s. A vacuum of approximately ≤150 mbar is applied and the material and the filler remain for an average dwell time of approximately 10 min to 200 min in the reactor before they are compressed. However, these values are only rough guidelines.

As a result thereof, the hydrolytic degradation as well as the oxidative degradation of the polycondensate is stopped and the polymer is prevented from sticking together. It is important that the plastic is not yet molten during the mixing with the filler, i.e., that the filler is not added into the melt. At the same time, an intensive mixing takes place between filler and polymer and/or a pre-homogenization, as a result of which a subsequent extrusion is facilitated and the end product becomes qualitatively better.

Tests showed that in this manner and by this manner of conducting the process in accordance with the invention a pre-drying of the fillers can be entirely eliminated and even raw, non-pre-dried fillers can be used without any complicated and cost-intensive thermal pre-treatment, which entails significant economical advantages and also accelerates carrying out the process and shortens the total time of the process. The drying of the polymer and of the filler advantageously takes place at the same time in a joint step. At least the process section of the production of the finished final mixing of polymer and of filler and/or of a master batch can be significantly simplified and accelerated in this manner.

Also, when using an expensive pre-dried filler the logistical treatment is more difficult since such fillers must be stored in their own silos fogged with dry air.

Furthermore, expensive coated or layered fillers to not have to be used in the process of the invention but rather the readily available and economical raw fillers can be used as long as the process conditions are observed.

Therefore, the process in accordance with the invention has several advantages relevant to practice over known processes.

Further advantageous embodiments of the process are given by the features of the dependent claims:

Thus, at least one inert powdery mineral, for example, kaolins, silicates, titanium dioxide, preferably calcium carbonate $CaCO_3$, that yield good technical properties in the end product, can be used as filler.

Also, a non-surface-treated or uncoated filler can be used as filler without this leading to a relevant hydrolytic degradation, which results in the reduction of costs already described above.

It is advantageous to use a filler with an average grain size or a D 50 value of less than 50 μm, in particular between 2 and 15 μm.

It is also advantageous to use a filler with a specific surface of 2 to 11 $m^2$/g, in particular 5 to 9 $m^2$/g, whereby the greater amount of moisture bound to this enlarged surface is also not disadvantageous for the process of the invention.

According to an advantageous method of carrying out the process the polymer material is present in a softened state and has a temperature of above 30° C. below its VICAT softening point (10 N) but not below approximately 5° C. of its melting point at the time of the addition of at least a partial amount, in particular the entire amount, of the filler. As a consequence, the filler adheres well to the surface of the polymer flakes and can be distributed well and homogenously. The VICAT softening point is determined according to ASTM DIN 1525; ISO 306, "A". The producers usually indicate the values for the polymers.

A mild but constant movement of the polymer material, which is optionally already filled with filler, is advantageous for the process of the invention. This prevents the clumping or adhering of the material in the critical temperature range until a sufficient crystallization of the surface of the particles prevents the sticking together of the individual particles themselves. Furthermore, a higher processing temperature is possible by the movement. It is ensured at the same time in the treatment container or cutting compressor during the mild and constant movement in addition to the stopping of adhesions that the temperature in the container becomes and remains sufficiently high and that each particle is protectively heated to the appropriate temperature respectively maintained at it. As a consequence, the filler is also intimately mixed with the polymer and taken up by the polymer, in particular by its soft edge areas. At the same time a separation of the migrating molecules from the surface of the particles is supported by the movement. To this end tools are advantageously used on difficult levels of the container during continuous processes and/or mixing tools in batch processes. It is not decisive how the temperature is introduced into the material. This can take place in a prior process or in the treatment container. However, this advantageously takes place by the rotating mixing tools themselves.

An efficient drying of the plastic material is achieved by vacuum support. A process conducted in this manner also requires a significantly lesser use of energy than comparable systems on account of the use of a vacuum. At the same time the fillers are effectively freed along with the polymer from the residual moisture. The applied vacuum also supports the diffusion process of the contaminations from the material and it also ensures their removal and a decontamination of the polymer. Furthermore, the vacuum protects the hot polymer particles and flakes from oxidative influences and/or damage, as a result of which a higher viscosity can also be achieved in comparison to other plant systems. Basically, the detoxification would also be possible with any inert gas. However, this is associated with distinctly higher costs.

The drying is supported by the certain advantageous minimum dwell time of the material at the adjusted temperature and the selected vacuum.

An appropriate dwell time ensures that a minimal cleaning of the material takes place and is a function of various criteria, namely the distribution rate of the migration products in the corresponding polymer and the softening temperature or melting temperature of the polymer.

The process in accordance with the invention can basically take place in a batch process or continuously. It should only be advantageously ensured that the engineering parameters such as temperature, dwell time and vacuum are maintained for the entire time. A continuous process proved to be especially purposeful for ensuring a uniform production course.

The fillers are advantageously added with such a residual moisture and such an amount that the inner moisture in the total system or the moisture of the mixture of filler and polymer is less that 100 ppm. With such a residual moisture the degradation is held within tolerable limits. Fillers are customarily added in a wide range of up to approximately 80% by wt., measured on the total weight of the mixture.

If the mixture or the polymer is held distinctly below a residual moisture in the total system of 100 ppm dry and the material for a corresponding time, approximately 1 h and at an appropriate temperature, approximately <200° C., in the reactor, this even can bring about an elevation of the viscosity.

Further Description of the Invention

The process in accordance with the invention can be carried out with different apparatuses: The apparatuses that are precisely and specifically described in the publications EP 123 771, EP 0 390 873, AT 396 900, AT 407 235, AT 407 970, AT 411 682, AT 411 235, AT 413 965, AT 413 673 or AT 501 154 are taken up with all their advantageous embodiments into the present invention and constitute an integral component of the disclosure. Such apparatuses are also used in practice and are known, for example, as "Erema Kunststoff [German=Plastic] Recycling System PC" or as "one-stage or two-stage Vacurema systems".

Different qualities regarding the degree of mixing, viscosity and degree of filling can be achieved as a function of the dosing-in points used for the filler to the polymer. It can also be purposeful to use several dosing-in points in order to minimize, e.g., the moisture load for a treatment step. In order to achieve very high degrees of filling it can also be helpful to dose filler in at several dosing points at the same time.

Different variants have proven themselves in tests for how the process for the filling of a hygroscopic thermoplastic polycondensate sensitive to hydrolytic degradation, in particular PET can be carried out:

Thus, the dosing in of filler can take place in the infeed range of an extruder. The vacuum of the reactor connected in front of the extruder acts into the worm of the extruder. There, the plastic flakes are not yet completely molten. The powdery, non-pre-dried filler is distributed and the mixture dried with the aid of vacuum and temperature. The dwell time until the melt is relatively short but is partially compensated by the higher temperature. The moisture can be minimized and therewith also the negative influence on the polycondensate. The polycondensate can be appropriately dried in the upstream processing steps, crystallized and, according to the case, even elevated in its viscosity by a suitable selection of the temperature and the dwell times.

This type of loading with non-pre-dried filler can also be used in combination with the following processes cited further below, in particular in order to achieve very high degrees of filling.

Another advantageous method consists in that the dosing in of the fillers takes place in a reactor or cutting compressor. The process in accordance with the invention for admixing the fillers and for the pre-treatment, workup- and/or recycling of the polycondensate in all its advantageous embodiments is customarily carried out in a receiving container or reactor. The plastic material to be treated, that is customarily present in the form of at least partially crystallized or non-crystallized or amorphous granulate, as new item or as reground material, is placed in this receiving container or reactor and treated under constant mixing or movement and/or comminution at elevated temperature. At least one comminuting tool and/or mixing tool that can rotate about a vertical axis is optionally arranged on several superposed planes and with working edges that act on the material in a comminuting and/or mixing manner is arranged in the reactor for the mixing and heating of the plastic material. This comminuting tool and/or mixing tool loads the polymer material with mechanical energy, which produces a heating and a simultaneous mixing and moving of the polymer material. The heating takes place here by conversion of the loaded mechanical energy or by friction. Such reactors are also used in practice and are known, for example, as Erema Kunststoff [German=Plastic] Recycling System PC or as one-stage or two-stage Vacurema systems.

The workup takes place at a temperature below the melting temperature and preferably above the glass transition temperature of the plastic material, whereby the polymer material is uniformly and constantly moved and thoroughly mixed. As a result, the plastic material is crystallized, dried and cleaned in one step.

The dosing of the filler takes place in the upper third of the reactor. This makes possible a sufficient dwell time that can be utilized for the drying and mixing of the filler with the flakes. The dosing in is possible above as well as below the uppermost material level. The dosing in below the uppermost level is preferred.

The advantage is also found here in the easy processing of two or more substance flows that do not have to be pretreated. Neither the filler nor the polycondensate must be appropriately pretreated or pre-dried. Both substance flows are continuously brought into the reactor and dried and or treated in a continuous process and supplied to the following extruder.

The process in accordance with the invention can also be carried out in two stages in accordance with a further method in an advantageous manner in an apparatus appropriately designed for this. Thus, for example, a mixture of crystallized and non-crystallized granulates or flakes can be placed as material to be cleaned in the crystallization dryer of the two-stage Vacurema reactor.

The two-stage treatment of the accumulating or added polycondensate takes place in this process, whereby during the pretreatment in the pre-treatment apparatus no plasticization of the material takes place but a crystallization and/or a certain pre-compression for simultaneous drying under vacuum does take place. The pre-compression is brought about at an appropriate temperature by mechanical loading and/or the introduction of energy into the material. In particular, the elevation or adjustment of the temperature takes place by the mechanical loading of the material converting the rotational energy of at least one mixing and/or comminuting element into thermal energy based on the occurring frictional losses.

During the main treatment in the main treatment apparatus the material is further dried, detoxified and, if necessary, crystallized at in particular an elevated temperature—the temperature can be less than in the pretreatment apparatus or equal to it—and maintained under a high vacuum for a certain average dwell time. Another mechanical loading or compression of material and the introduction of energy by at least one mixing or comminuting element take place, which element introduces the appropriate thermal energy into the material on account of its rotation and further heats it. The main treatment, that takes place under a vacuum, reduces the residual moisture to a given, determined average value and also brings it about that volatile contaminants are separated out of the material. The temperature during the main treatment is maintained below the melting temperature of the material. However, the attempt should be made to set this temperature as high as possible.

The dosing in of the filler takes place here in the crystallization drier. Basically, all loading positions are possible, e.g., top, in the middle or bottom. When using calcium carbonate that was not surface-treated and therefore has an enlarged surface and therefore also the possibility of absorbing more moisture, the dosing in the upper third is appropriate in order to keep the dwell time high and to achieve an appropriate drying. In this version the second main reactor container serves as a further drying and mixing stage for the filler and the polymer.

In this process the crystallization dryer as well as the main treatment apparatus are continuously operated.

A further variant consists in that two parallel crystallization dryers connected in front of a cutting compressor as main treatment apparatus are operated in batch operation. In this instance a complete mixing of polymer and filler is filled into a container, heated under a vacuum, crystallized dry, mixed, etc. After a defined batch time pretreated material is transferred into the main treatment apparatus. However, it can also be transferred to an external extruder under dry air conditions. The advantage in the batch process are the very exact mixing ratios or dry conditions that can be adjusted. Also, the processing time can be adapted according to temperatures, exhaust moisture and/or mixing time. Since the filling of the crystallization dryer takes place under normal atmosphere, the loading the plastic and/or filler poses no problems. No pre-evacuation for the loading is necessary.

In all these processes the filled plastic material is plasticized or molten by way of conclusion, during which it is supplied e.g., to an extruder or processed to granulate, optionally after a filtering, in particular under vacuum conditions.

Furthermore, the invention provides the particular use of a filler. This use is a function in its advantageous embodiments of the process steps of the dependent process claims.

The introduction of auxiliary dispersing agents is another possibility for achieving high filler components. They can be introduced either with the filler, separately in the same process step or also in a prior process step. These auxiliary dispersing agents result in a moistening of the PET surface. The powder adheres to this surface subsequently. It is obvious that this effect functions better as the surface of the PET flakes increases relative to the volume. Since thinner PET bottles are always produced in order to save material, this trend comes to oppose the effectiveness of the homogenization. Auxiliary dispersing agents can be, for example, oily, waxy, readily adhesive substances.

The process of the invention is presented in detail in the following using non-limiting advantageous exemplary embodiments.

EXAMPLE 1

Polyethylene terephthalate (PET) in the form of flakes of comminuted bunches is heated in a cutting compressor to a temperature of 100° to 240° C., preferably 130° to 210° C. A non-pre-dried filler, namely, calcium carbonate $CaCO_3$ is added from above, preferably below the level of the material. The circumferential speed of the outermost agitating tip of the comminuting or mixing tool is in a range of 2 to 35 m/s, preferably 3 to 20 m/s. A vacuum of ≤150 mbar, preferably ≤50 mbar, in particular ≤20 mbar, especially between 0.1 to 2 mbar is applied. The PET material and the filler remain for an average dwell time of 10 min to 200 min, especially 40 min to 120 min in the reactor and are then drawn off in the lower area and supplied to an extruder that compresses and melts the mixture.

EXAMPLE 2

Washed ground polyester matter from beverage bottles, transparent, no contamination, with a bulk density of 325 kg/m$^3$, an average moisture of 3500 ppm and an average intrinsic viscosity of 0.74 dl/g is introduced into a cutting compressor of the brand Vacurema® Basic 1108. The average pretreatment temperature of the material mixture is approximately 200° C. at a vacuum of approximately 6 mbar. Mixing and agitating tools were rotating in the interior of the container. The mixing and agitating tools act on the material in a comminuting manner and ensure at the same time that the material is heated by friction. This causes a mixing thrombus to be formed in the cutting compressor, during which a vertical gradient is produced. The flakes migrate through the cutting compressor with a certain dwell time. The material in the upper range tends to be coarser and cooler and the material in the lower range softer and in smaller pieces. A clumping of the material is prevented by the constant motion and the polymer flakes remain constantly freely flowing.

Furthermore, a powder dosing apparatus is arranged on the cutting compressor. With it, coated CaCO3 with a bulk density of 655 kg/m$^3$ and an average moisture of 1280 ppm is added at the cutting compressor. A dosing of 25% CaCO3 in powdery form into the ground PET matter takes place, namely, into a lower area of the container in which the material is already present in a softened state. Alternatively, the addition can also take place from above. The filler is intimately and homogeneously mixed with the softened material in this matter and the mixture is subsequently melted, optionally degassed, filtered and granulated in the extruder.

The extruder is connected to the cutting compressor in its lower area. The mixing tools transport the softened material into the infeed area of the extruder, that is operated at a worm speed of 145 rpm, a throughput of 300 kg/h, a melting temperature of 295° C. and a filtration of 50/250 mesh.

EXAMPLE 3

This exemplary embodiment runs analogously to example 2 with slight deviations, namely:

Washed ground polyester matter from beverage bottles, transparent, no contamination, with a bulk density of 390 kg/m$^3$, an average moisture of 6500 ppm and an average intrinsic viscosity of 0.75 dl/g is introduced into a cutting compressor of the brand Vacurema® Basic 1108. The average pretreatment temperature of the material mixture is approximately 195° C. at a vacuum of approximately 7.1-12 mbar.

Furthermore, non-coated CaCO3 with a bulk density of 820 kg/m$^3$ and an average moisture of 3280 ppm is added. A dosing of 22% CaCO3 in powdery form into the ground PET matter takes place.

The extruder is operated at a worm speed of 120 rpm, a throughput of 294 kg/h, a melting temperature of 299° C. and a filtration of 50/250 mesh.

In this manner qualitatively high-grade, bubble-free end products are obtained.

The invention claimed is:

1. A process for producing a thermoplastic polymer polycondensate material, which is sensitive to hydrolytic degradation and/or is hygroscopic, the process comprising mixing at least one filler with a not yet molten and/or softened polymer material under vacuum conditions, constant agitation, thorough mixing and elevated temperature, wherein the filler has not been pre-dried at the time of mixing and has a residual moisture ($H_2O$) of more than 500 ppm, wherein the at least one filler is mixed in with the not yet molten and/or softened polymer material in a crystallization drier having top, middle and bottom loading positions and wherein the at least one filler added to the not yet molten and/or softened polymer in the top upper third loading position.

2. The process according to claim 1, wherein a non-surface-treated or uncoated filler is used as filler.

3. The process according to claim 1, wherein the polymer material is present in a softened state and has a temperature of above 30° C. below its VICAT softening point (10 N) but not below its melting point at the time of the addition of at least a partial amount.

4. The process according to claim 1, wherein the fillers are used with such a residual moisture and in such an amount that the moisture in the total system and the moisture of the mixture are less than 100 ppm.

5. The process of claim 1 wherein, thermoplastic polymer polycondensate material is PET, the at least one filler is calcium carbonate ($CaCO_3$), and the residual moisture ($H_2O$) is more than 1000 ppm.

6. The process of claim 1, wherein the polymer material is present in a softened state and has a temperature of above 30° C. below its VICAT softening point (10 N) but not below its melting point at the time of the addition of the entire amount of the filler.

7. The process according to claim 1, wherein the at least one filler is Calcium Carbonate ($CaCO_3$).

8. The process according to claim 1, wherein the at least one filler is an inert powdery mineral.

9. The process according to claim 8, wherein the inert powdery mineral is one of kaolins, silicates, titanium dioxide, or calcium carbonate ($CaCO_3$).

10. The process according to claim 1, wherein a filler with an average grain size or a D 50 value of less than 50 μm, and/or with a specific surface of 2 to 11 m$^2$/g, is used as filler.

11. The process of claim 10, wherein the filler average grain size or a D 50 is between 2 and 15 μm and/or the specific surface of 5 to 9 m$^2$/g.

12. The process according to claim 1, wherein the thermoplastic polycondensate polymer material is subjected to the pre-treatment in a continuous flow and/or that the process is carried out continuously or discontinuously or as a batch process.

13. The process according to claim 12, wherein the process is carried out discontinuously or as a batch process.

14. The process according to claim 1, wherein the mixture is subjected after the workup has taken place by way of conclusion to an optional compression step.

15. The process according to claim 14, wherein the optional compression step is a melting and/or an extrusion.

* * * * *